March 20, 1962  E. FREYSTEDT ET AL  3,026,458
ELECTRIC CLOCK DRIVE

Filed July 7, 1958  5 Sheets-Sheet 1

Inventors.
Erich Freystedt, &
Robert Nicolaus.
By
Atty

March 20, 1962  E. FREYSTEDT ETAL  3,026,458
ELECTRIC CLOCK DRIVE
Filed July 7, 1958  5 Sheets-Sheet 3

Inventors.
Erich Freystedt, &
Robert Nicolaus.
By [signature] Atty.

March 20, 1962  E. FREYSTEDT ETAL  3,026,458
ELECTRIC CLOCK DRIVE

Filed July 7, 1958  5 Sheets-Sheet 4

Inventors,
Erich Freystedt, &
Robert Nicolaus.
By [signature] Atty.

March 20, 1962  E. FREYSTEDT ETAL  3,026,458
ELECTRIC CLOCK DRIVE

Filed July 7, 1958  5 Sheets-Sheet 5

Inventors,
Erich Freystedt, &
Robert Nicolaus.
By [signature] Atty.

United States Patent Office 3,026,458
Patented Mar. 20, 1962

3,026,458
ELECTRIC CLOCK DRIVE
Erich Freystedt, Munich, and Robert Nicolaus, Munich-Forstenried, Germany, assignors to Siemens & Halske Aktiengesellschaft Berlin and Munich, a corporation of Germany
Filed July 7, 1958, Ser. No. 746,885
Claims priority, application Germany July 11, 1957
18 Claims. (Cl. 318—132)

This invention relates to electric time pieces and is particularly concerned with an electric drive for time pieces without the use of intermediate energy storage means, the drive acting directly upon the oscillating system which determines the timing, namely, upon a pendulum, tuning fork, balance or the like.

It is known to use for drives of time pieces transistors for amplifying control impulses derived from the mechanical oscillating system and conducting the amplified impulses to a driving or motor coil. The control impulses are usually produced by induction, by the use of magnetic fields which, however, are undesirable in the case of time pieces because they may affect accurate time keeping. The intensity and duration of the control impulses depend in such cases in undesirable manner upon the amplitude of the mechanical oscillating system; accordingly, the drive coil and therewith the operation of the corresponding time piece are exposed to fluctuations of the amplitude of oscillations depending upon temperature fluctuations, shocks and the like, which may result in disturbances.

The invention also employs a transistor for the control of the electric drive for the oscillating system of time pieces, preferably for the balance of small time pieces or watches. In accordance with the invention, the transistor is, however, not used in a customary amplifier circuit; drive impulses with predetermined intensity and duration, which are substantially independent of the oscillating system, being produced in a locking oscillator circuit in which the control energy for the transistor is derived from an electromagnetic feedback circuit with the oscillator circuit thus being "locked" to the mechanical oscillating system. The mechanical oscillating system, for example, the balance, merely serves for the release of the impulses, thereby synchronizing the working impulses with the frequency of the oscillating system. Due to the feedback, the intensity and duration of the working impulses are essentially determined by the dimensioning of the circuit and are thus wholly or nearly wholly unaffected by the amplitude of the balance of the oscillating system.

A considerable advantage of the drive according to the invention, as compared with known transistor drive circuits, is seen in the fact that the release of the drive impulses does not require permanent magnet fields. Moreover, the wires for the coils may be of a larger gauge than in prior drive devices, because very short impulses with relatively high current peaks may be produced with the locking oscillator circuit. Extraordinary difficulties which are experienced in the fabrication of coils with very thin wires are thus greatly reduced.

The invention also makes it possible to use silicon transistors in place of germanium transistors, until now generally employed in such drives, because the locking oscillator circuit delivers very short impulses with relatively high current strength, which can be sufficiently amplified by means of silicon transistors. The use of silicon transistors, as contrasted with germanium transistors, results in a further advantage, namely, the drive is less subject to trouble because silicon transistors are not as sensitive to the temperature as are germanium transistors.

In accordance with the invention, the new drive may be constructed by forming the feedback circuit for the locking oscillator by a bridge with a feedback branch and an opposing branch, and controlling the effective feedback coupling by disturbing the balance of the bridge by a magnetic conductor provided upon the oscillating system, for example, upon the balance wheel, such conductor increasing the inductance of the drive coil upon reaching the proximity thereof, and thereby causing release of the working impulse.

Alternatively, there may be employed a locking oscillator circuit with fixed feedback, and a transistor with a working point set so that the amplification is insufficient for the automatic generation of working impulses, and increasing the amplification by momentarily applying a release voltage or release current at the input of the transistor, under control of the mechanical oscillating system, to produce self-excitation by way of the feedback. The control of the release voltage or release current for the transistor is advantageously effected by means of a switch formed by structural parts provided as a matter of course between the mechanical oscillation system and the time piece gear, such switch being momentarily closed in the rhythm of the inherent oscilations of the oscillating system.

In order to effect the flow of magnetic flux from the fixed coil to the magnetic conductor of the oscillating system with a high degree of efficiency, a plurality of pole pieces or pole shoes may be provided upon the coil core or upon the oscillating system, such pole pieces alternately mutually overlapping, so as to form two or more plane or cylindrical working air gaps which are operatively connected in parallel.

The foregoing and other objects and features of the invention will be brought out in the description which will be rendered below with reference to the accompanying drawings showing embodiments of the invention in more or less diagrammatic representation.

Figure 1:
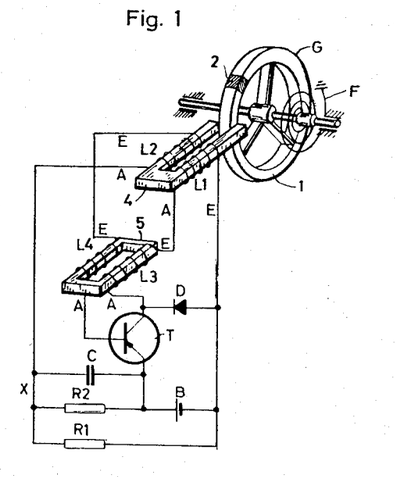
FIG. 1 shows in schematic manner a locking oscillator with feedback bridge circuit controlled by the balance of a time piece.

The embodiment shown in FIG. 1 employs as a mechanical oscillation system a schematically indicated small balance wheel G provided with a spiral spring F, the balance wheel oscillating with a maximum deflection of about 200° from the normal position thereof. The balance carries peripherally thereof a magnetic conductor 2, preferably made of soft magnetic material, for example, ferrite, which is in the course of its oscillation enters with very small air gap on each side into the open laminated core 4 between the legs carrying the windings L1 and L2. L1 is the driving winding and L2 is the feedback winding, both such windings being connected together with the windings L3 and L4 of an opposed coupling repeater comprising the core 5. Letter T indicates a transistor connected in emitter circuit; D is a diode; C is a blocking capacitor; and R1, R2 are resistors jointly forming a voltage divider. The resistors serve for setting the working point of the transistor T. Letters A and B indicate the starts and the ends of the windings, assuming identical winding sense with respect to the magnetic flux. In order to impress upon the magnetic conductor 2 a drive pulse by the action of the drive coil L1, it is necessary that such pulse is effective within the brief interval beginning with the instant at which the downwardly swinging conductor 2 begins to enter into the space between the legs of the core 4 and ending with the instant at which it has fully entered into such space. The last noted position corresponds to the normal position of the balance wheel 1 in which position the balance spring F is fully relaxed and therefore exerting no torque with respect to the balance wheel. In this normal position, which represents the midpoint of the balance oscillation, no drive force about the axis of rotation of the balance wheel is exerted by the drive coil L1, because the forces transmitted to the conductor 2 and therewith to the balance wheel G have in such position no component acting in tangential direction.

In order to explain the operation, it shall first be considered how the acceleration impulses required for maintaining the oscillation are periodically imparted to the balance wheel. This is effected by very brief but relatively strong current impulses flowing through the drive or motor winding L1 when the magnetic conductor 2 begins to enter into the space between the legs of the core 4. The circuit may of course be constructed so that such a drive or motor pulse is not only produced as described, when the conductor 2, moving counterclockwise, enters into the core 4, but also when it moves clockwise from below into the core, that is, during each half of the oscillation.

In order to release the drive impulse always exactly at the proper instant, that is, at the described oscillation position of the balance wheel, it will be necessary to synchronize the locking oscillator circuit by the balance wheel. This is effected by unbalancing a bridge circuit, comprising the opposing coupling branch 5, L3, L4 and the feedback branch 4, L1, L2, which is at equilibrium when the magnetic conductor 2 is out of the core and approximately in the position in which it is illustrated. The coils L1 to L4 are for this purpose so dimensioned and poled that, so long as the conductor 2 is away from the pole ends of the core 4, any current alteration occurring in the windings L1 and L3 induces in the windings L2 and L4 a voltage of identical magnitude but acting oppositely. The resultant voltage between the base of the transistor T and the joining point $x$ of the parts C, R1 and R2 is accordingly zero. The partial voltage of the winding L2 is thereby poled for the feedback coupling and the partial voltage of the winding L4 is poled for the opposing coupling.

The inductance of the windings L1 and L2 is increased when the conductor 2 enters between the legs of the core 4. The increase of inductivity of the winding L1 alters the voltage condition between the windings L1 and L3 so that the voltage equilibrium between the windings L2 and L4 is at the secondary side of the repeater disturbed, causing increase of the feedback coupling effect while reducing the opposed coupling effect. The feedback coupling increases further with increasing entry of the conductor 2 and reaches a maximum when the conductor 2 has fully entered, that is, when it has reached its normal position. The operative increase in the entire feedback coupling loop reaches with increasing feedback coupling very soon the value 1, at which instant is released the impulse. The working point of the transistor and therewith its initial amplification is set by proper dimensioning of the voltage divider resistors R1 and R2 so that even a slight increase of the feedback coupling effect will suffice to release the impulse. The transistor T is always controlled so that its collector voltage is by the voltage impulse occurring at the windings L1 and L3 shifted into the saturation range in which the characteristic curves are bent and strongly crowded. The magnitude of the voltage impulse is accordingly essentially determined by the battery voltage.

During the brief impulse, the base current of the transistor charges the capacitor C in blocking direction until the difference between the feedback coupling voltage, induced in the windings L2 and L4, and the blocking voltage built up in the capacitor, becomes insufficient to maintain the transistor conductive, that is, to compel the flow of a base current, which in turn causes a sufficiently quickly rising collector current; it must be considered in this connection that a sufficient feedback coupling voltage can be induced only by sufficiently speedy increase of the collector current. As soon as the speed of increase of the collector current is reduced, the difference between the induced feedback coupling voltage and the blocking voltage at the capacitor will be quickly reduced, and the current impulse in the collector circuit will accordingly be suddenly interrupted. The current in the collector circuit corresponds substantially to the current taken from the battery. However, sudden cessation of the current in the collector circuit will not cause interruption of the current in the windings L1 and L3, because the field built up in the coil cores 4 and 5 now begins to break down, inducing in the windings L1 and L3 a voltage poled oppositely to that of the preceding voltage impulse. The semiconductor diode D, previously poled in blocking direction, now becomes conductive, the circuit closing over this diode. The coil current continues to flow with decreasing intensity in the same direction as before until the energy stored in the magnetic field is dissipated. The entire working impulse accordingly consists of a charging impulse, the energy for which is taken from the battery, and a discharge impulse for which is utilized the energy stored in the coil cores 4 and 5.

The breaking down of the coil field also induces voltages in the windings L2 and L4 which are of opposite phase to the previously produced voltages. However, since the partial voltage at the winding L2 predominates, the resultant voltage is poled in blocking direction and is added to the blocking voltage of the capacitor C for the duration of the discharge impulse. Since no base current can flow, such voltage impulse remains ineffective.

The blocking capacitor C which had been charged during the impulse now discharges over the resistors R1 and R2, its voltage accordingly fluctuating between the maximum blocking voltage and the valve which determines the sufficient initial amplification effected by the transistor. This working point inevitably requires a normal current which is useless for the drive and it is accordingly for reasons of saving the battery necessary that the voltage required at the capacitor C for the sufficient amplification be reached when the balance wheel is in the next oscillation or half oscillation shortly ahead of the position in which is delivered, by the inductivity increase, the release criterion for the next impulse. The dimensioning of the resistors R1 and R2 must therefore simultaneously fulfill two conditions and is codetermined by the capacitance of the blocking capacitor C which also affects the duration and therewith the energy content of the charging impulse.

The diode D permits at the windings L1 and L3 only singly poled voltage variations and, accordingly, by singly poled damping of the inherent resonance of the repeaters, prevents the appearance of parasitic self excitation at higher frequencies which would entail auxiliary energy consumption and cause premature and undefined release of the drive impulse, thereby jeopardizing the proper synchronization by the position of the balance wheel.

It shall now be explained with reference to FIGS. 2, 2a, 3 and 3a, how irregularities in the oscillation of the balance wheel caused, for example, by alteration of the bearing friction, which may result in timing errors, may be compensated by effecting the release of the drive or motor impulses so that these impulses have in addition to a greater driving component also a smaller braking component. The release of the impulse must for this purpose be effected at an angular position of the oscillating system, such that the current impulse persists beyond the instant at which the tangential component of the magnetic field, produced by the control impulse, which determines the drive impulses for the oscillating system, passes through zero and reverses its direction.

Figure 2:
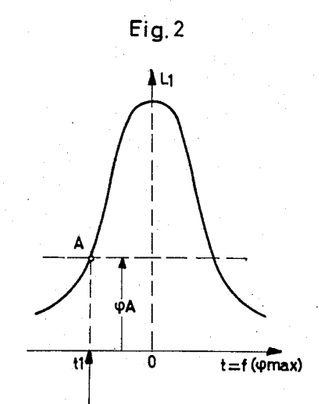
FIGS. 2, 2a, 3 and 3a are diagrams to aid in explaining the operation of the control circuit shown in FIG. 1.
Figure 2A:
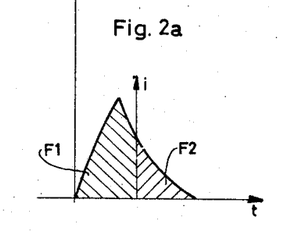
Figure 3:
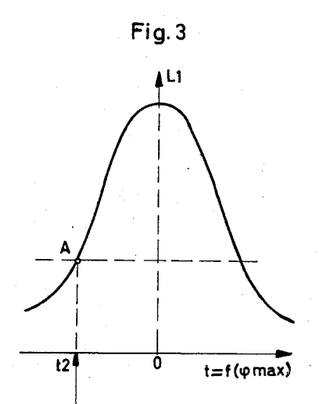
Figure 3A:
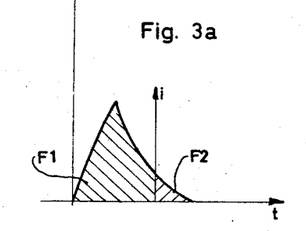

In FIGS. 2 and 3, the course of the inductance L1 of the drive winding is for two different amplitudes plotted above the time $t$. The release of the impulse generated in the locking oscillator circuit is with identical oscillation deflection $\alpha A$ always effected at the point A. In the case indicated in FIG. 2, assuming greater amplitude and, accordingly, higher velocity with respect to zero passage, the angle $\alpha A$, at which the impulse is released, is reached at the instant $t1$; in the case of FIG. 3, assuming lower oscillation amplitude and, accordingly lower passage velocity, the corresponding angle is reached at the earlier instant $t2$. In the case of the lower amplitude, for example, in the presence of increased bearing friction, the impulse is, therefore, released sooner than in the case of higher amplitude resulting from lower friction. Since the impulse indicated in FIGS. 2a and 3a (current $i$ dependent upon the time $t$) persists in the first noted case (at higher amplitude) considerably beyond the passage through the median position ($\alpha=0$), as compared with the second case (lower amplitude), the drive impulse resulting as the difference of the hatched areas F1 and F2, at the left and right of the ordinate, will be smaller in the first case than in the second case. Accordingly, a stronger resultant impulse will be given at lower amplitude so as to overcome the bearing friction which caused such lower amplitude. The result is a self-regulation dependent upon the amplitude, whereby amplitude fluctuations are held within narrow limits.

Figure 4:
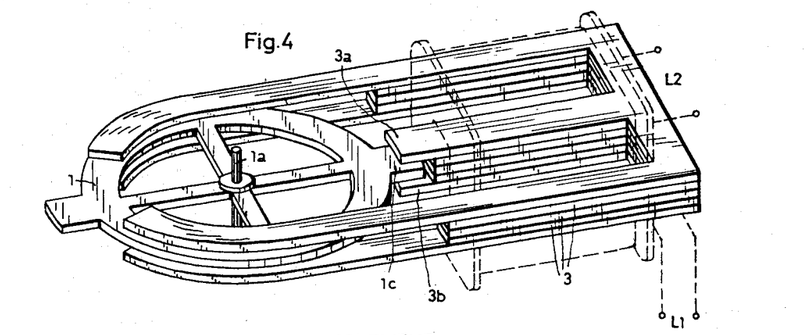
FIG. 4 shows an example of the coil core carrying a plurality of windings of the locking oscillator circuit and the balance wheel of the time piece which oscillates with respect thereto.

FIG. 4 shows a particularly advantageous embodiment for the inductive interaction between the magnetic conductor carried by the balance wheel and the coil carrying the drive or motor winding L1 and the feedback coupling winding L2. The balance wheel is represented as an oscillatably journalled disk 1, such as is used, for example, in small time pieces.

The disk 1 is made of magnetically conductive material, for example, stamped from a sheet of such material, and is provided with two diametrically oppositely disposed ears or extensions, one of which (1c) oscillates between the stationary pole pieces 3a and 3b of the central limb of a three-limb core 3. The central leg is provided with the windings L1 and L2, the ends of which are extended to the right and conducted to the locking oscillator circuit according to FIG. 1. The magnetic flux produced by the windings in the coil core enters from the pole pieces 3a and 3b into the hole piece 1c of the balance wheel, and from there, branching to two sides, back into the arcuately curved ends of the upper and lower sheets of the core. In the illustrated normal position, the restoring force of the balance spiral (not shown) as well as the tangential component of the drive or motor force exerted upon the balance wheel by the drive coil L1, equal zero.

The advantage of this structure resides in an increase of the initial magnetic transition values in the air gaps, which are obtained by the opposing disposition of the large pole piece surfaces of the overlapping pole pieces which delimit the working air gaps. The air gap dimensions which are present in the direction of the magnetic flux can easily be provided in the fabrication; moreover, small alterations in the dimensions of these air gaps, that may be caused by the journal play of the balance arbor 1a, have a negligible effect on the effective air gap.

However, the illustrated shape of the pole pieces does not only provide for magnetic efficiency; it also permits accurate dimensioning of the air gaps with regard to the optimum course of the alteration of inductance of the coil L1 and L2, respectively, depending upon the deflection angle $\alpha$. This will be apparent upon considering that, on the one hand, radial increase in the length of the pole pieces 1c, 3a and 3b will serve to vary the depth of entry (radial overlapping length) and, on the other hand, variation in the width of these pole pieces will serve to vary the flux cross section, so as to obtain the dependence of the inductance (L) upon the deflection angle ($\alpha$) which is most favorable for the control. It will be readily appreciated from FIG. 4 that two parallel mutually interacting working air gaps may also be obtained by equipping the balance with two pole pieces instead of providing them on the central leg of the core.

Figure 5:
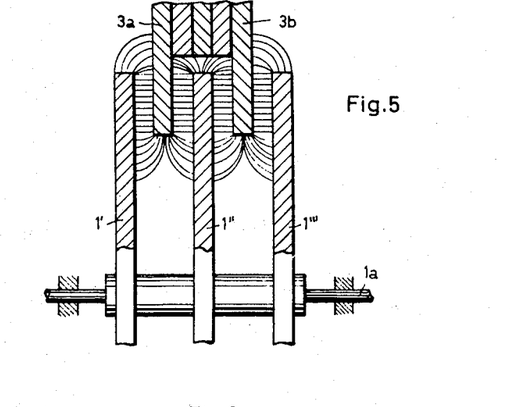
FIG. 5 indicates schematically and in sectional view an embodiment which is slightly modified as compared with the embodiment according to FIG. 4.

FIG. 5 shows another possibility for an embodiment, indicating in longitudinal section the two pole pieces 3a and 3b, of the coil core carrying the windings L1 and L2. These pole pieces interact in this embodiment with three pole pieces of the balance which comprises three disks 1', 1'' and 1''' provided equally spaced upon the shaft 1a. In this case, there are formed between the balance and the core four parallel effective working air gaps; accordingly, as compared with the embodiment shown in FIG. 4, there is obtained a doubling of the flux cross section in the working air gaps.

Figure 6:
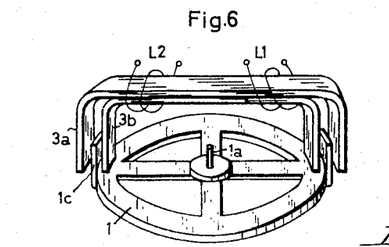
FIG. 6 illustrates likewise in schematic manner a modification of the embodiment according to FIG. 4, comprising pole pieces formed by cylinder segments disposed concentric to the axis of the balance wheel and extending into the working air gaps.

FIG. 6 shows in schematic manner an embodiment in which the pole surfaces are not plane and disposed in mutually parallel planes, but are formed as small segments of cylinders extending concentric to the balance shaft or arbor.

Figure 7:
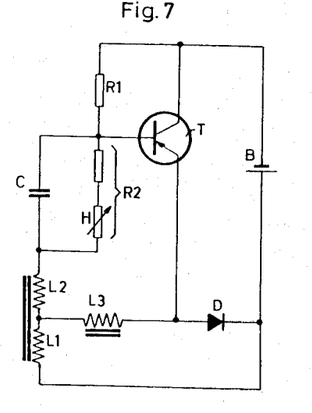
FIG. 7 shows in schematic manner a simplification of the circuit according to FIG. 1.

FIG. 7 shows a circuit which is, as compared with FIG. 1 simplified, by making the feedback coupling branch in the form of a three-point or delta circuit, the necessary opposing coupling voltage being produced as an inductive voltage drop at the winding L3 in the emitter conductor. The winding L4 is omitted and the windings L1 and L2 are coextensive and are provided with taps. The pole-correct connection of the windings L1 and L2 is thus reliably assured. References R1 and R2 again indicate the resistors which jointly form a voltage divider, consisting, however, of two parts, namely, a normal resistor and a thermistor H.

The resistors R1 and R2 serve for adjustably setting the working point of the transistor. If the temperature of the transistor T should change during the operation, the initial characteristic curve thereof would be detrimentally shifted, resulting in alteration of the originally set working point. Due to shifting of the initial characteristic curve of the transistor, the deflection angle of the balance or the pendulum, at which the impulse is to be released, would be changed so that, responsive to lowering of the temperature, the impulse would be released progressively later and finally not at all because of insufficient amplification resulting from the shifting. In the presence of temperature increase, the impulse would always be released sooner, until a point is reached when the release is effected in an angular position of the oscillating system at which the efficiency drops. The thermistor H, the resistance of which increases with decreasing temperature, is so dimensioned that detrimental consequences of the shifting of the initial characteristic curve of the transistor, caused by temperature fluctuations, are within the temperature range to be considered in practice, substantially compensated.

Figure 8:
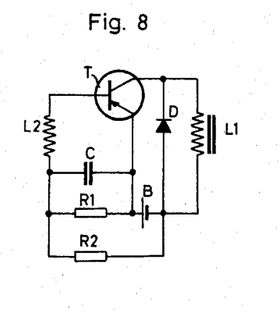
FIG. 8 represents the principle of a circuit with fixed feedback in which the automatic generation of impulses depends solely upon the working point of the transistor.

FIG. 8 shows the basic circuit for the embodiments next to be described, wherein the locking oscillator circuit operates with fixedly set feedback coupling and wherein the working point of the transistor is set so that the amplification is normally (during the pauses between impulse) insufficient for automatically generating drive impulses. The mechanical oscillating system is, however, effective to produce for the input of the transistor during each full oscillation or each half-oscillation a voltage or current impulse, causing brief shifting of the working point thereof in the direction of higher amplification, until there occurs self-excitation by the action of the feedback coupling. FIG. 8 only shows the locking oscillator circuit comprising as in the case of the embodiment according to FIG. 1, in addition to the transistor T, the semiconductor diode D, the blocking capacitor C, the voltage divider resistors R1 and R2, and the windings L1 and L2, which are again disposed upon a core; L1 again operating as the drive or motor winding. They are mutually fixedly coupled and poled in the sense of a feedback coupling. The core of FIG. 1, with the windings provided thereon, is omitted.

Figure 9:
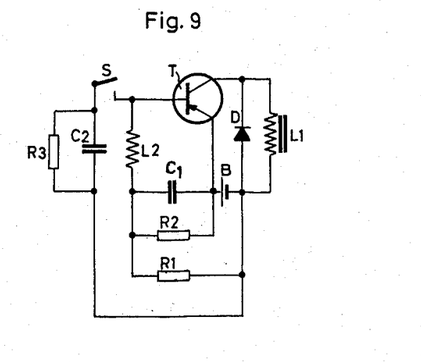
FIGS. 9, 10 and 11 indicate various possibilities for shifting the working point of the transistor in rhythm of the oscillation into the active range, by impulse means affected by the oscillating system.

In accordance with FIG. 9, the raising of the working point of the transistor may be effected by the charging current surge of a capacitor C2 having the resistor R3 connected in parallel therewith. This resistor serves for discharging the capacitor during the pauses between the impulses. At S is shown a switch which is momentarily closed by the mechanical oscillation system during each full oscillation or each half-oscillation. In view of FIG. 1, the switch would have to be closed at the instant at which the magnetic conductor 2 begins to enter between the limbs of the coil core 4. The charging current surge of the capacitor C2 is thereby caused to affect the base of the transistor. The winding L2 offers for this charging current a high apparent resistance, so that the circuit is primarily closed by way of the emitter-base path of the transistor, thereby briefly shifting the working point thereof in the direction of higher amplification, until the amplification in the feedback coupling loop equals 1. When this is obtained, the drive impulse, due to the feedback coupling, will be operative in the manner already explained with reference to FIG. 1, without being affected, with respect to its course and duration, by the switch S and particularly by the duration of closure thereof. The energy content of the firing impulse produced by the switch S may be very weak as compared with that of the drive impulse proper. It is only necessary to provide for a sufficient voltage peak so as to pull the working point of the transistor briefly sufficiently beyond the triggering threshold.

Figure 10:
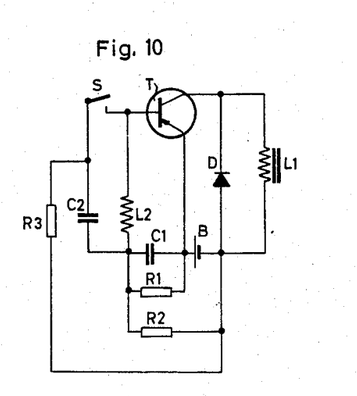

FIG. 10 differs from the circuit according to FIG. 9 merely by affecting the base of the transistor upon closure of the switch S not only by the charging current but also by the discharge current of the capacitor C2, which is charged over the resistor R3 during pauses between impulses.

Figure 11:
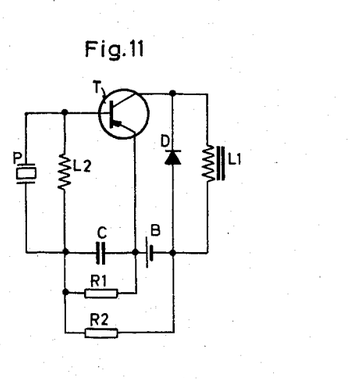

FIG. 11 shows another possibility of producing the release voltage (firing voltage) for shifting the working point of the transistor in the direction of higher amplification. There is provided a piezoelectric impulse element P, for example, a flexing oscillator, which is being flexed by a pin or cam carried by the balance arbor, at the instant at which the magnetic conductor (2 in FIG. 1) begins to enter between the limbs of the core (4) of the drive winding.

The required firing voltage may also be produced by making the magnetic conductor 2 (FIG. 1) wholly or partially of permanent magnet material or by suitably disposing in the immediate vicinity of the conductor 2 a small permanent magnet, in such a manner, that the permanent magnet field produces in the winding L2, responsive to entry of the balance between the legs of the core 4, a voltage impulse which becomes effective as firing impulse for the locking oscillator circuit.

There also is the possibility of providing upon the mechanical oscillating system, for example, upon the balance, some radioactive material, so that upon entry of the magnetic conductor between the legs of the core 4 (FIG. 1) an irradiation of charge carriers will be effected directly upon the transistor or upon a suitable energy converter, each irradiated fast charge carrier liberating a greater number of slower charge carriers which are conducted to the base of the tansistor, thereby firing the locking oscillator. Such a firing device will operate independent of the amplitude of the balance and, in addition, completely free of secondary effects, because the balance need not give off any mechanical energy.

Figure 12:
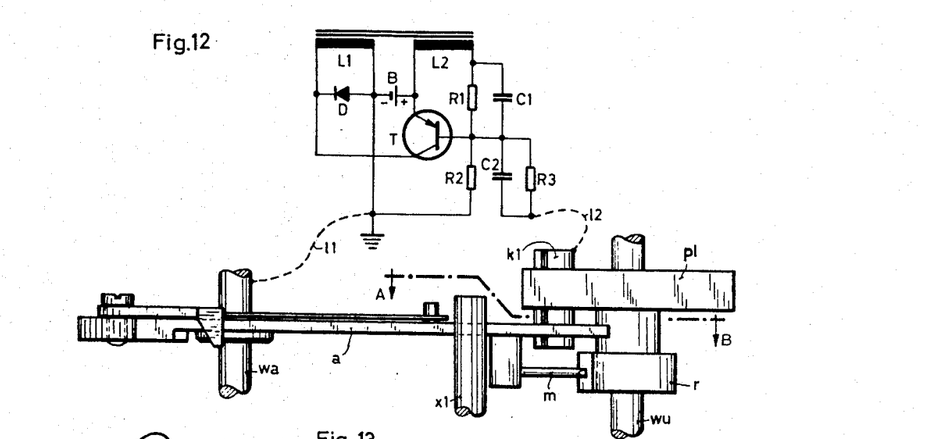
FIG. 12 shows a structural embodiment of the release switch S of FIGS. 9 or 10, in side view thereof.
Figure 13:
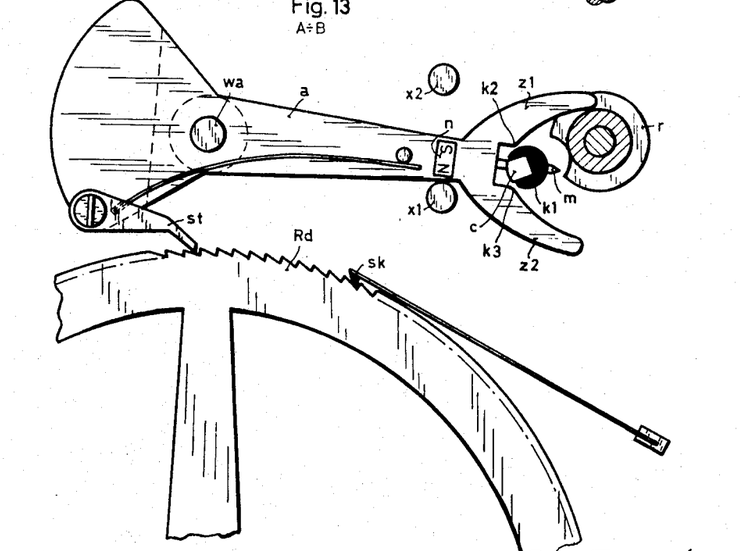
FIG. 13 is a plain view of the switch as seen along line A—B of FIG. 12.

FIGS. 12 and 13 show a particularly favorable structure for the release switch S referred to in connection with the circuits according to FIGS. 9 and 10. FIG. 12 shows in the upper part thereof a locking oscillator circuit corresponding substantially to the one also shown in FIG. 9 and in the lower part an edge view of the balance arbor and the switching device operated thereby, and FIG. 13 shows a plan view of the switch mechanism and the blocking pawl wheel for the pointer drive operated thereby, as seen when looking along line A—B of FIG. 12. As will be apparent, the auxiliary switch which closes the charging current circuit for the capacitor C2, thereby releasing the impulse for the locking oscillator circuit, is formed by a contact $k1$ secured to the plateau $p1$ of the balance and by the fork-shaped ends $z1$ and $z2$ of an armature $a$ carried by the shaft $wa$. The feed 11 to the armature shaft is indicated in dash lines at the top of FIG. 12; it may be in the form of a flexible conductor, for example, a very soft spiral. The restoring force produced thereby in the case of small armature strokes, is to be very small. In order to render this restoring force and also the normally occurring exterior torque accelerations harmless, there may be a permanent magnet provided upon the armature, as indicated in FIG. 13, for pulling the armature in the respective end position against stops $x1$ and $x2$, made of magnetically conductive material, thereby more accurately defining the angular position of the balance at which the electrical contact $k1$ respectively touches the ears $z1$ and $z2$ of the armature fork. The feed to the contact $k1$ is schematically indicated by the dash line 12. The spiral spring of the balance may be advantageously used for this purpose; its inner end may be suitably connected to the balance arbor or shaft $wa$ and its outer end may be connected to a stationary part, for example, to a part of the casing. The outer end must be electrically insulated from the casing; the balance arbor is electrically insulated by its jewel bearing. The arbor $wu$ carries in addition to the plateau carrying the contact $k1$, in usual manner the securing roller $r$ which cooperates with the knife $m$ provided on the armature $a$. An insulating jewel $c$ is indicated in the contact $k1$ for reliably preventing upon entry of the contact $k1$ into the armature fork, a premature contact coaction between the conductive contact $k1$ and the likewise conductive fork ends $z1$ and $z2$. The operatively effective contacting is to be effected only when the contact $k1$ touches in one half-oscillation the edge of $k2$ and in the other half-oscillation the edge of $k3$. The edge $k2$ and $k3$, just like $k1$, must be made of wear resisting contact material. In order to prevent undesirable contacting between the securing roller $r$ and the knife $m$ cooperating therewith, the securing roller or the knife may be made of insulating material. The armature $a$ carries the pawl $st$ coacting with the toothed annulus of the locking wheel $Rd$ which is also operatively engaged by the schematically indicated locking pawl $sk$.

Changes may be made within the scope and spirit of the appended claims which define what is believed to be new and desired to have protected by Letters Patent.

We claim:

1. An electronic drive for a time piece having a mechanical oscillating element and a transistor circuit controlled by said element in rhythm with the oscillations thereof for conducting electromagnetic drive pulses thereto, a locking oscillator circuit comprising a drive coil and a capacitor for producing for each half-oscillation electromagnetic drive pulses in the form of individual current surges the intensity and duration of which are independent of the action of said oscillating element and for conducting said drive pulses directly to said element to sustain oscillation thereof, an electromagnetic feedback coupling circuit forming part of said locking oscillator circuit, and circuit means for deriving the energy for controlling said transistor exclusively from said feedback coupling circuit, said transistor operating solely as a switch, said mechanical oscillating element carrying a magnetic conductor interacting with the feedback coupling circuit of said locking oscillator circuit to change the inductivity thereof for releasing said drive pulses solely depending upon the angular position of said oscillating element as distinguished from the angular velocity thereof, each drive pulse consisting of two parts, namely, a charging current surge causing the magnetic field in said drive coil to increase to a maximum and a discharge pulse which utilizes the energy stored in said field, whereby each drive pulse increases steadily to a maximum independent of the amplitude of the oscillating element, said capacitor being charged during said current surge by the base current of said transistor and the latter being at cut-off during the discharge thereof, thereby utilizing the magnetic energy which is during the current surge stored in said field for lengthening the drive-impulse, which is after cessation of the collector current impulse effected by the voltage induced upon break-down of said magnetic field, such induced voltage polarizing a parallel connected semiconductor diode in pass direction, thereby closing the circuit for the driving current until the stored energy is consumed, and effecting operation of said transistor solely as a switching element.

2. A structure and cooperation of parts according to claim 1, wherein said transistor is a silicon transistor.

3. A structure and cooperation of parts according to claim 1, wherein said feedback coupling circuit comprises a bridge circuit including a feedback coupling branch containing said drive coil and also including an opposing coupling branch, the operatively effective feedback coupling being controlled by disturbing the equilibrium of said bridge circuit by the action of the magnetic conductor carried by said oscillating element, said magnetic conductor increasing the inductivity of said drive coil upon approaching said drive coil during the oscillation of said element.

4. A structure and cooperation of parts according to claim 3, comprising two magnetically uncoupled transmission members each comprising a core carrying two windings, said members respectively forming said feedback coupling branch and said opposing coupling branch, one of the windings of said feedback coupling branch constituting said drive coil, said magnetic conductor carried by said mechanical oscillating element being adapted to enter incident to the oscillation thereof into an air gap formed in the core carrying said drive coil for increasing the inductivity of said drive coil, thereby effecting impulse-like excitation to impress upon said magnetic conductor an attraction pulse propagated thereby to the mechanical oscillating element.

5. A structure and cooperation of parts according to claim 3, comprising two magnetically uncoupled transmission members, each having at least one winding thereon, said members respectively forming said feedback coupling branch and said opposing coupling branch, the windings of said feedback coupling transmission members being coextensive and interconnected by way of a tap with a single winding of a coil forming said opposing coupling branch, one of the windings of said feedback coupling branch constituting said drive coil, said magnetic conductor carried by said mechanical oscillating element being adapted to enter incident to the oscillation thereof into an air gap formed in the core carrying said drive coil for increasing the inductivity of said drive coil, thereby effecting impulse-like excitation to impress upon said magnetic conductor an attraction pulse propagated thereby to the mechanical oscillating element.

6. A structure and cooperation of parts according to claim 4, comprising a plurality of mutually alternately overlapping pole pieces for the magnetic flux flow between cooperating parts, said pole pieces forming at least two working air gaps cooperatively connected in parallel.

7. A structure and cooperation of parts according to claim 6, wherein said pole pieces are disposed upon the coil core.

8. A structure and cooperation of parts according to claim 6, wherein said pole pieces are disposed upon the oscillating element.

9. A structure and cooperation of parts according to claim 6, wherein said pole pieces are disposed upon the coil core and upon the oscillating element, respectively.

10. A structure and cooperation of parts according to claim 1, comprising a voltage divider for determining the operatively effective working point of said transistor, said voltage divider including an electrical resistance with negative temperature coefficient for compensating temperature fluctuations of said transistor.

11. A structure and cooperation of parts according to claim 1, wherein each drive pulse is released at an angular position of said oscillating element at which such pulse persists beyond the instant at which the tangential component of the magnetic field produced thereby and determining the drive energy for said element passes through zero and reverses its direction.

12. A structure and cooperation of parts according to claim 11, wherein the magnetic energy stored in the coil cores during the transmission of said drive pulses in the collector circuit of said transistor is utilized for extending the operative effect of said drive pulses, said stored energy being after cessation of the collector current impulse and breaking down of the coil field effective as induced voltage in the corresponding coil windings, said diode connected in parallel with said coil windings, said induced voltage polarizing the diode in pass direction in the circuit carrying the driving current and thereby maintaining the driving current until the stored energy is dissipated.

13. A structure and cooperation of parts according to claim 12, wherein said diode and said transistor form a structural operating unit.

14. A structure and cooperation of parts according to claim 12, wherein said diode and said transistor form a structural operating unit disposed within a common casing.

15. A structure and cooperation of parts according to claim 1, wherein the operatively effective working point of said transistor is such that amplification does not suffice for automatically producing drive pulses during pauses between pulses, an electrical release criterion being operative at the transistor input by the action of said mechanical oscillating element for briefly shifting said working point to effect self-excitation by the operation of said feedback coupling.

16. A structure and cooperation of parts according to claim 15, comprising a switch controlled by said mechanical oscillating element for connecting current from said capacitor to the base of said transistor.

17. A structure and cooperation of parts according to claim 16, wherein said switch comprises mutually cooperating parts of the time piece mechanism between which is established brief contact in the rhythm of the oscillation of said mechanical oscillating element.

18. A structure and cooperation of parts according to claim 15, comprising a piezoelectric impulse device controlled by said mechanical oscillating element for producing the electrical release criterion for the input of said transistor.

References Cited in the file of this patent

UNITED STATES PATENTS

| 2,829,324 | Sargeant | Apr. 1, 1958 |
| 2,831,114 | Van Overbeek | Apr. 15, 1958 |
| 2,843,742 | Cluwen | July 15, 1958 |

FOREIGN PATENTS

| 1,090,564 | France | Oct. 20, 1954 |